US006824043B2

(12) United States Patent
Navarro Jimenez

(10) Patent No.: US 6,824,043 B2
(45) Date of Patent: Nov. 30, 2004

(54) ELECTRONIC BALLOT-BOX

(75) Inventor: Juan de Dios Navarro Jimenez, Madrid (ES)

(73) Assignee: Indra Sistemas, S.A., Madrid (ES)

( * ) Notice: Subject to any disclaimer, the term of this patent is extended or adjusted under 35 U.S.C. 154(b) by 0 days.

(21) Appl. No.: 10/362,899

(22) PCT Filed: Mar. 22, 2002

(86) PCT No.: PCT/ES02/00145

§ 371 (c)(1),
(2), (4) Date: Feb. 25, 2003

(87) PCT Pub. No.: WO02/077930

PCT Pub. Date: Oct. 3, 2002

(65) Prior Publication Data

US 2003/0178479 A1 Sep. 25, 2003

(30) Foreign Application Priority Data

Mar. 23, 2001 (ES) .......................................... 200100683

(51) Int. Cl.⁷ ............................................... G07C 13/02
(52) U.S. Cl. ........................................... 232/2; 235/57
(58) Field of Search .............................. 232/2; 235/57, 235/51, 386

(56) References Cited

U.S. PATENT DOCUMENTS

| | | | | |
|---|---|---|---|---|
| 4,021,780 A | * | 5/1977 | Narey et al. | 235/54 F |
| 4,981,259 A | * | 1/1991 | Ahmann | 232/2 |
| 5,535,118 A | | 7/1996 | Chumbley | |
| 5,610,383 A | | 3/1997 | Chumbley | |
| 2003/0034386 A1 | * | 2/2003 | VonNida et al. | 235/57 |

OTHER PUBLICATIONS

Patent Abstracts of Japan, vol. 018, No. 353, Jul. 4, 1994—Seiji Kouhou Center, KK.

* cited by examiner

Primary Examiner—William L. Miller
(74) Attorney, Agent, or Firm—Ruden McClosky; Robert M. Schwartz

(57) ABSTRACT

Electronic ballot box of the type used in elections that not only enables the voting slips to be scanned when they are deposited in the box, despite the fact of their being in an envelope in order to assure voting secrecy, using emission of a light for this purpose, but also permits the totalling of the votes for each of the candidatures and the setting of the electoral process parameters (voters, geographical bounds, candidatures, etc.) and those of the machine itself. It is also provided with a PCMCIA card, where the electoral database is stored. The machine can work either in voting mode or in management mode, so that absolute control is available over the operation of the equipment.

10 Claims, 3 Drawing Sheets

ELECTRONIC BALLOT-BOX

TECHNICAL FIELD

The present invention relates generally to ballot boxes. More specifically, the present invention relates to an electronic ballot box having a system for reading voting slips in the ballot box.

The purpose of the ballot boxes is to collect the votes of electors in electoral processes, so that the votes cast may be compiled in a single container, whilst also fully assuring the intention of the elector's vote.

The object of the present invention is to demonstrate an electronic ballot box which makes it possible to know how an elector has voted by scanning the voting slip when it is deposited in the ballot box, even if it is inserted in an envelope, so that in this way not only may the voters assigned to a given ballot box be monitored, but the ballot box may also be set up according to the parameters of the electoral process, candidates, geographical bounds, voting slip design, etc.

The present invention therefore comes under the head of ballot boxes used in elections and more specifically of electronic ballot boxes whose functions include the reading of voting slips, monitoring of voters and management of the box itself.

PRIOR ART

Hitherto the most widely used ballot boxes have had no electronic system to assist the vote counting process, the boxes being merely a receptacle in which electors deposit their votes.

Although on the one hand this system is simple, it does have a series of drawbacks, such as for instance lack of control by electronic means over the voters assigned to a given ballot box, so that such situations may arise as the same person voting twice, unauthorized persons voting, and prohibited or improper items being inserted. Although these eventualities may be monitored by members of the electoral panel, this control system is open to human error.

Furthermore, when the voting period terminates the counting process has to be conducted by opening the ballot box and reading the voting slips one by one to obtain the vote. These slips are then classified so as to proceed to count the number of votes corresponding to each of the different options, and finally to check that the total votes cast match the number of votes received by each of the parties. It is quite commonplace for a wide variety of contingencies to arise, so that the final result can only be announced with several hours' delay, while there is even a possibility of errors occurring.

On the other hand, electronic ballot boxes have been developed which, although equipped in some cases with a scanner for reading the vote, do not allow the voting slip to be read if it is inside an envelope and are not provided with any software to enable the ballot box to be set up according to the features of the electoral process with regard to such aspects as geographical bounds, candidatures, candidates and size of voting slips. Furthermore, they do not possess any software for the management both of the machine itself and of the voters assigned to said ballot box. They are not provided with a results transmission and printing system either.

To date the electoral machines on the market have been based on CIS (Contact Image Sensor) technology and are only capable of recognizing the marks made directly on the voting slip, but are unable to identify said marks if the slips are inside an envelope.

The purpose of the present invention, therefore, is to overcome the foregoing drawbacks by developing for this purpose a ballot box which surpasses the electronic ballot boxes currently on the market in that its functional features include not only scanning the voting slip when it is inside an envelope at the time the voting slip is deposited, but also storing and classifying the votes cast, as well as monitoring electors prior to voting to decide whether they are authorized to proceed to cast their vote. Furthermore it is provided with means for transmitting information to a central management system.

SUMMARY OF THE INVENTION

The electronic ballot box in question is a ballot box that enables voting slips to be read at the time when they are deposited in it, even though they may be in an envelope, provided with two sets of software, one for setting up the actual electoral process with regard to such parameters as the geographical bounds, candidatures, candidates or voting slip design, whilst the function of the other set is to control the hardware items of the box.

The method used for scanning the voting slips, even when they are in an envelope, which assures the confidentiality of voters, is that of existing CIS (Contact Image Sensor) technology, to which a light source is added.

The electoral setup software enables an electoral database to be created on a PCMCIA card with the information referring to a given ballot box, such as the particulars of the voters assigned to that box for instance. The aforesaid card is then inserted in the box, thereby assuring that only the assigned electors may vote.

In order to assure better control, the machine can function in two different modes:

a) In voting mode, when the ballot box performs the tasks involved in vote casting and counting, which is only available to voters.
b) In management mode, in which it may only be operated by a representative of the Authorities, when the tasks of maintenance and transmission of data to a central unit can be performed.

From the point of view of configuration, the ballot box consists of a scanner responsible for performing the scanning operation when the voting slip is deposited, even if in an envelope, so that the system will go on totalling the votes of the different candidatures, while it is also provided with a device for controlling the scanner. It has a display to assist communication with the voter, a keypad for setting up the ballot box, and a PCMCIA card where the actual features of the electoral process are stored, along with the voters and results of the ballot. In order to enable the data to be transmitted to a central computer, the machine has an internal MODEM. Furthermore, once voting has come to an end, to enable the results to be printed, the ballot box is provided with a parallel communications port to an external printer, so that a printout of the election results is available immediately. The ballot box has a built-in power supply for the different components making up the box.

BRIEF DESCRIPTION OF THE DRAWINGS

In order to supplement the description set forth below and to facilitate a better understanding of the features of the present invention, an accompanying set of figures showing the most significant details of the invention is included for informative and non-restrictive purposes.

FIG. 1 shows a schematic view of the ballot box that is the preferred embodiment of the present invention.

DETAILED DESCRIPTION OF THE PREFERRED EMBODIMENT

In light of the aforementioned Figures, a preferred embodiment of the invention is described below along with an explanation of the drawings.

Figure 1:
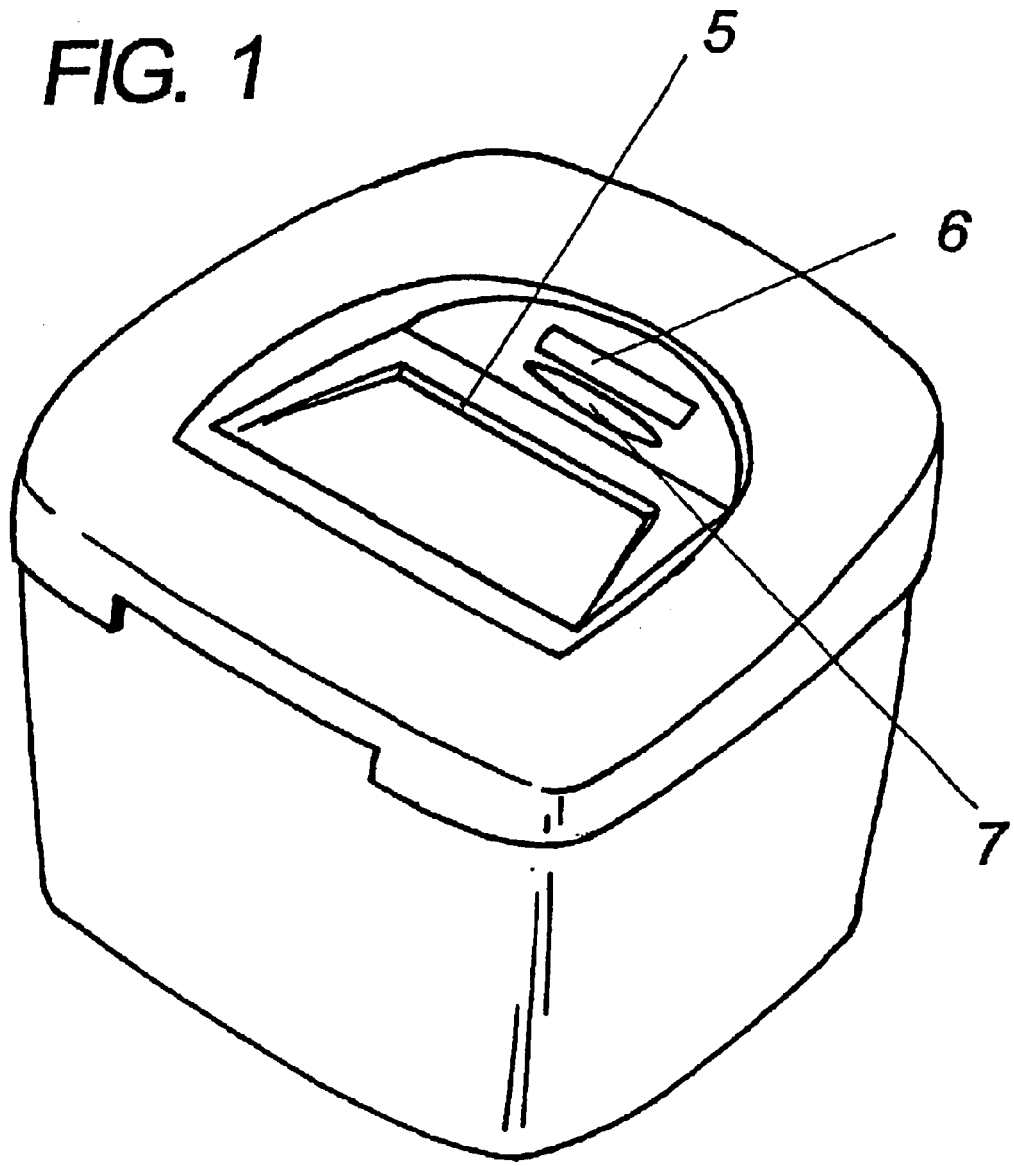

In FIG. 1 we see how the electronic ballot box in question is provided with a scanner (5) of sufficient resolution to permit the scanning of the votes cast at the moment when they are deposited, it being possible to read both marks or characters through the envelope. The system will provide a running total of the votes for each candidature and under no circumstance will any information be stored on the content of the vote of any particular elector.

Furthermore, the box is equipped with a viewer or liquid crystal display (6), which provides a means of communication both with the voters and with the authorized personnel responsible for the machine maintenance. It also possesses a keypad (7) for performing the different functions of the system. The machine has a PCMCIA card (10) for saving data both of the electoral process, the voters and of the results being obtained. In addition, the internal modem (11) enables the final results to be transmitted to a central computer, which will be responsible for compiling the results from the rest of the ballot boxes. The box is equipped with a parallel communications port (12) in order to be able to print the final results on an external printer. The whole afore-mentioned set of hardware is fed by a built-in power supply (13).

Figure 2:
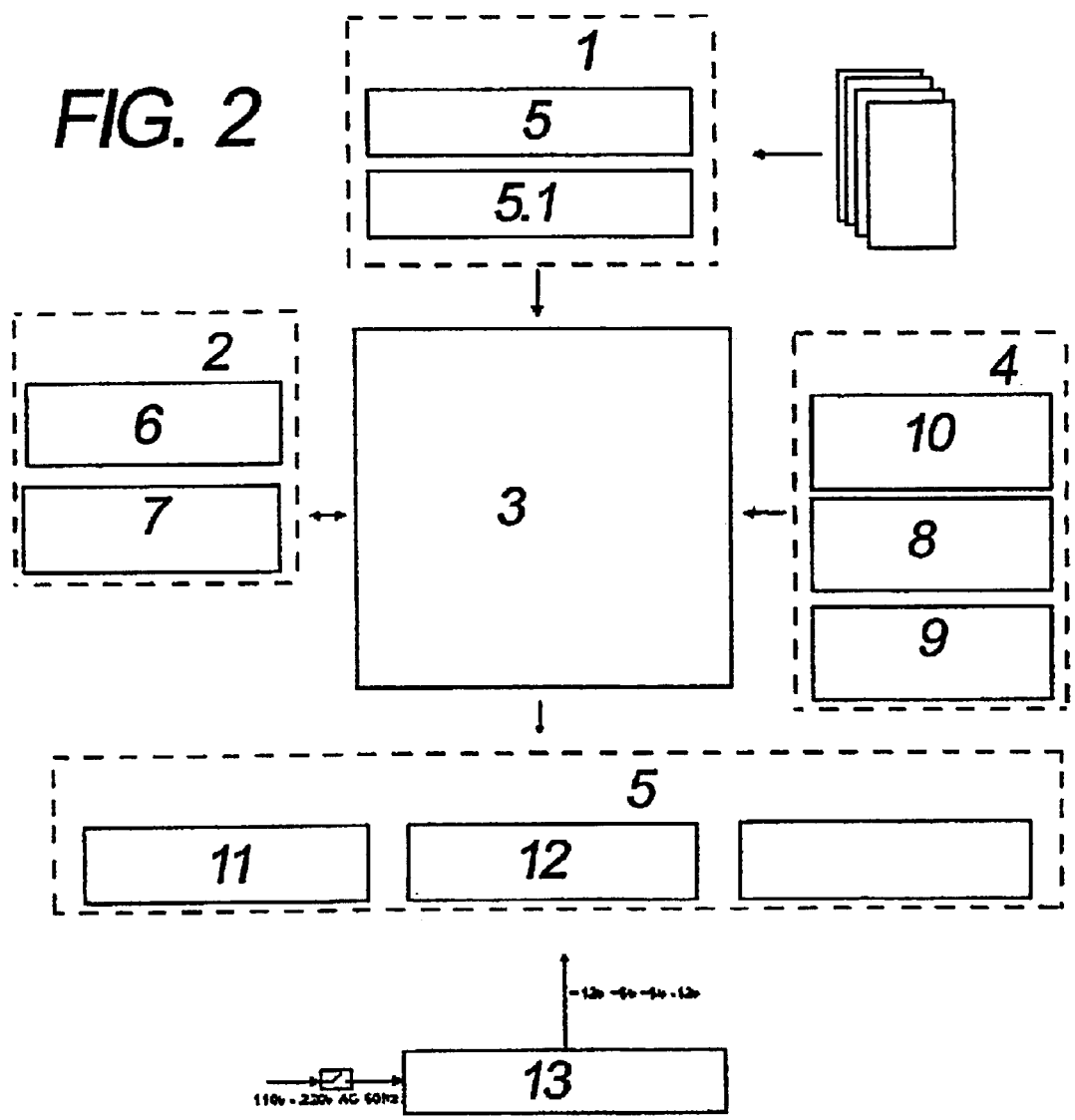
FIG. 2 shows an explanatory block diagram of the electronic ballot box.

In FIG. 2 we observe a block diagram of the components making up the electronic ballot box, wherein the whole assembly is governed by a microprocessor (3), which receives the information from the data input (1), communicates with the user interface (2) and with the configuration (4), and transmits results (5).

The data input (1) is made up of a scanner (5) of sufficient capacity to be able to read the voting slip, even if it inside an envelope, and is provided with a scanner controller (5.1). The user interface consists of a display (6) and a keypad (7). The equipment configuration consists of a hard disk (9), a serial port (8) and a PCMCIA card (10) for data storage. Lastly, the result transmission block is formed of a MODEM (11) and a printer port (12), while the whole assembly is fed by a power supply (13).

Figure 3:
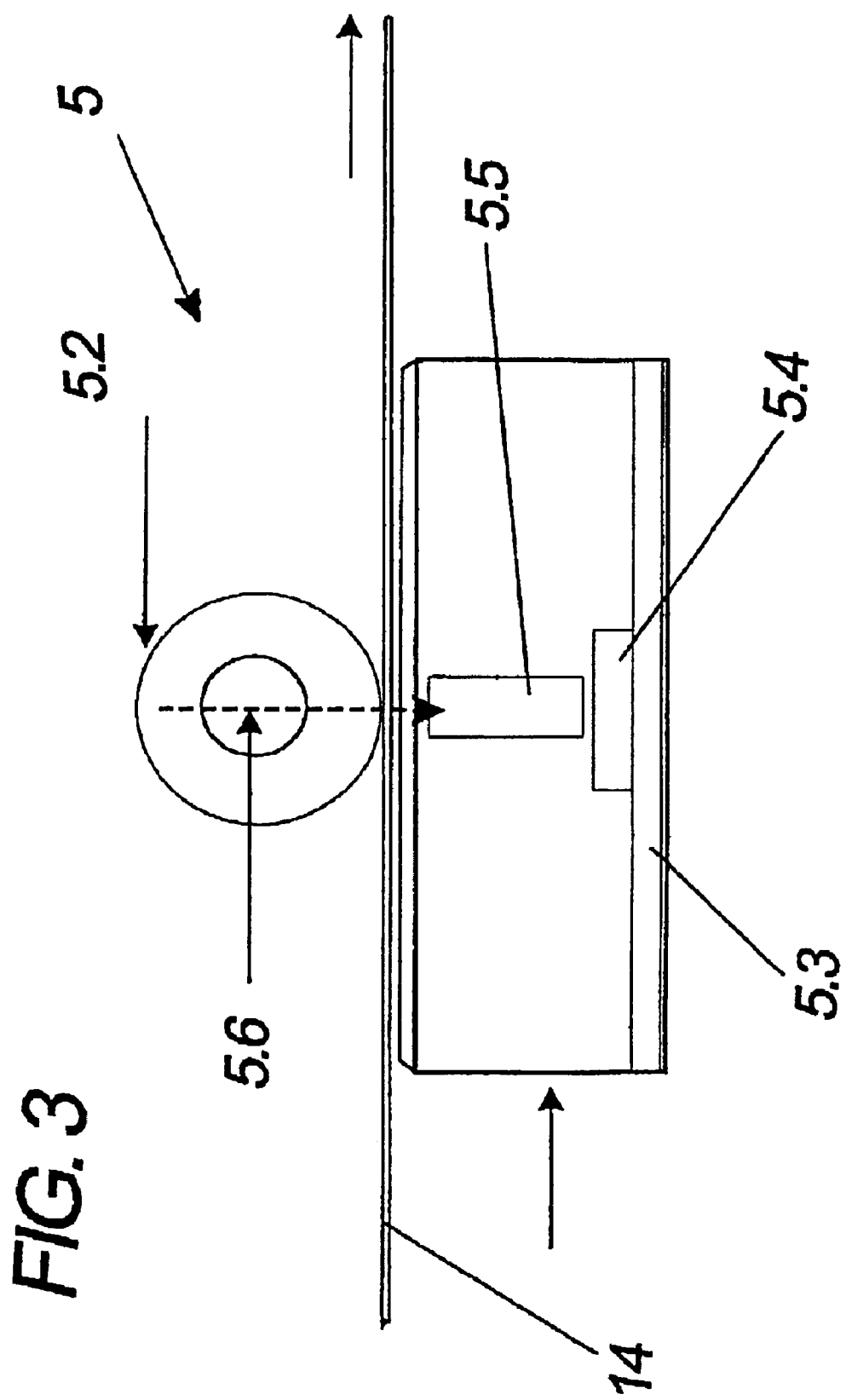
FIG. 3 shows a sectional view of the scanner of the preferred embodiment of the present invention.

In FIG. 3 we see that the scanner (5) responsible for reading the voting slips, even if directly in an envelope, is made up of a light source (5, 6) in a tensioning roller (5, 2), under which the envelope (14) passes at constant speed, while the reading of the voting slip is actually performed by means of the guide (5.5), sensors (5.4) and the printed circuit (5.3).

It is not considered necessary to expand on this description for any expert on the subject to be able to appreciate the scope of the invention and the advantages stemming from same.

The materials, shape, size and arrangement of the component items will be open to modification providing that they do not alter the essential nature of the invention.

The terms in which this report is described should always be taken in the broadest, non-restrictive sense.

What is claimed is:

1. An electronic ballot box for scanning voting slips, comprising:

a scanner governed by a scanner controller; and a voting slip placed in a voting slip envelope, wherein said voting slip is scanned by said scanner through said voting slip envelope.

2. The electronic ballot box according to claim 1 wherein said scanner comprises a light source, a tensioning roller, a printed circuit, a set of sensors, and a guide, wherein said voting slip envelopes pass between said tensioning roller and said guide at a constant speed.

3. The electronic ballot box according to claim 2 wherein said electronic ballot box is controlled by a microprocessor to manage a data input, a user interface, and configuration and result transmission modules.

4. The electronic ballot box according to claim 1 wherein said electronic ballot box further includes a viewer or display and a keypad to facilitate communication between a voter and a system manager, and wherein said ballot box is programmable for parameters of the electoral process and the management of hardware components.

5. The electronic ballot box according to claim 4 wherein said electronic ballot box is controlled by a microprocessor to manage a data input, a user interface, and configuration and result transmission modules.

6. The electronic ballot box according to claim 4 wherein said parameters define geographical bounds, candidatures, and voting slip design.

7. The electronic ballot box according to claim 1 wherein said electronic ballot box is controlled by a microprocessor to manage a data input, a user interface, and configuration and result transmission modules.

8. The electronic ballot box according to claim 1 wherein said electronic ballot box further includes an internal PCMCIA card for storing electoral setup data, votes of the voting slips, and particulars of the electors assigned, a serial port, a hard disk, an internal modem for transmitting data to a central computer, a parallel port for transmitting to and printing said results on an external printer, an a power supply.

9. The electronic ballot box according to claim 1 wherein said electronic ballot box can operate in a voting mode to perform vote casting and vote counting tasks, or in a management mode to perform maintenance and result printing.

10. A method for scanning voting slip envelopes, comprising: placing a voting slip in a voting slip envelope; receiving said voting slip envelope containing said voting slip in an electronic ballot box having a scanner; and scanning said voting slip through said voting slip envelope by said scanner.

* * * * *